July 2, 1963 J. H. HOLLYDAY 3,095,962
CONVEYING APPARATUS
Filed Jan. 11, 1961 4 Sheets-Sheet 2

INVENTOR
JAMES H. HOLLYDAY
BY Joseph C. Brown
ATTORNEY

July 2, 1963  J. H. HOLLYDAY  3,095,962
CONVEYING APPARATUS
Filed Jan. 11, 1961  4 Sheets-Sheet 3

INVENTOR
JAMES H. HOLLYDAY
BY *Joseph A. Brown*
ATTORNEY

July 2, 1963  J. H. HOLLYDAY  3,095,962
CONVEYING APPARATUS
Filed Jan. 11, 1961  4 Sheets-Sheet 4
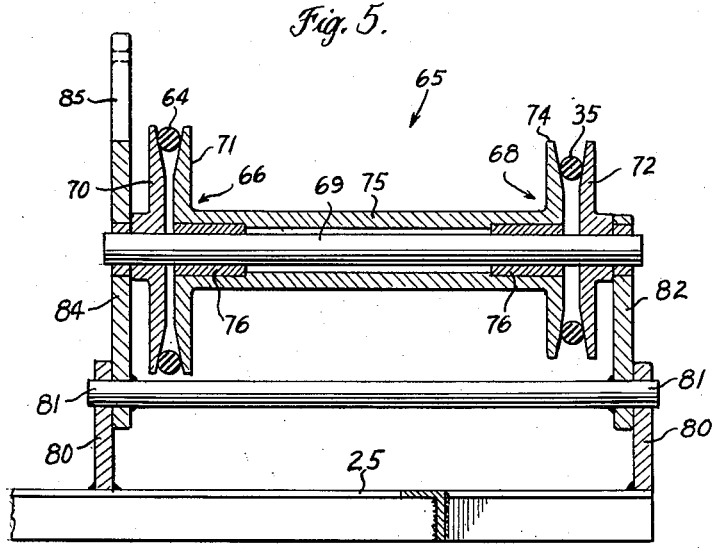
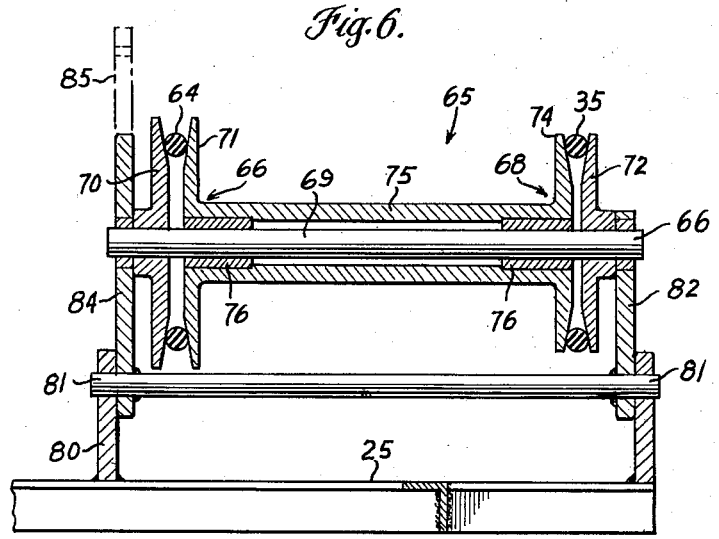
INVENTOR
JAMES H. HOLLYDAY
BY Joseph A. Brown
ATTORNEY 3,095,962
CONVEYING APPARATUS
James H. Hollyday, New Holland, Pa., assignor to Sperry Rand Corporation, New Holland, Pa., a corporation of Delaware
Filed Jan. 11, 1961, Ser. No. 82,015
10 Claims. (Cl. 198—128)

This invention relates generally to conveying apparatus and more particularly to a device mounted on a baler to receive bales and throw them rearwardly. Still more specifically, the invention relates to improved drive means for operating a bale thrower.

Heretofore, a bale thrower has been provided which is connected to the rear or discharge end of a baler and laterally swingable relative thereto. Successive bales discharged from the baler are deposited in the thrower and thrown thereby to a trailing wagon. The tongue of the wagon is pivotally connected to the bailer and the wagon trails behind the baler. The thrower is linked to the wagon tongue to produce lateral swinging of the thrower responsive to changes in direction of travel of the baler. This insures that thrown bales will land in the wagon regardless of the position of the baler relative to the wagon.

The thrower is driven by a gasoline engine mounted on the thrower and swingable therewith. A push-pull rod extends from the engine to the baler operator on the tractor towing the baler so that the operator can control the speed of the thrower and thus the distance a bale is thrown. The engine has an air intake cleaner which must be kept clear for proper performance of the engine. Frequent cleaning of the intake cleaner is required because it is located in a position where it is subjected to a considerable amount of fines, dust and particles of crop material resulting from the baling operation. A substantial amount of air bourne material is produced by the baler pick-up, the infeed mechanism and by the bale forming plunger, all of which are located forwardly of the bale thrower. On forward travel of the baler, some of this material passes over the engine and the air intake cleaner.

To eliminate the engine on the bale thrower and drive the thrower off the baler is a simple task where the thrower is fixedly mounted relative to the baler. However such a drive connection is difficult where the thrower is swingable from side to side relative to the bale case of the baler, particularly when it is considered that thrower speed control is required and the cost of the drive for the thrower should not exceed the cost of a small gasoline engine.

A main object of this invention is to provide on a baler having a bale thrower, improved means for driving the thrower from the same means which drives the various operative components of the baler, particularly where the thrower is laterally swingable relative to the baler.

Another object of this invention is to provide a bale thrower drive of the character described which has incorporated therein speed control means.

Another object of this invention is to provide a bale thrower drive of the character described which will operate in a prescribed manner regardless of the lateral position of the thrower relative to the baler.

Another object of this invention is to provide a bale thrower drive which requires little attention and maintenance on the part of the baler operator.

A further object of this invention is to provide a bale thrower drive which is durable and has a long operative life.

A still further object of this invention is to provide a bale thrower drive which is inexpensive to fabricate, assemble and operate.

Other objects of this invention will be apparent hereinafter from the specification and from the recital in the appended claims.

In the drawings:

FIG. 5 is an enlarged section taken on the lines 5—5 of FIG. 1 looking in the direction of the arrows and showing the speed control means of the thrower drive; and FIG. 6 is a view similar to FIG. 5 but showing the parts in a different operative position.

Figure 1:
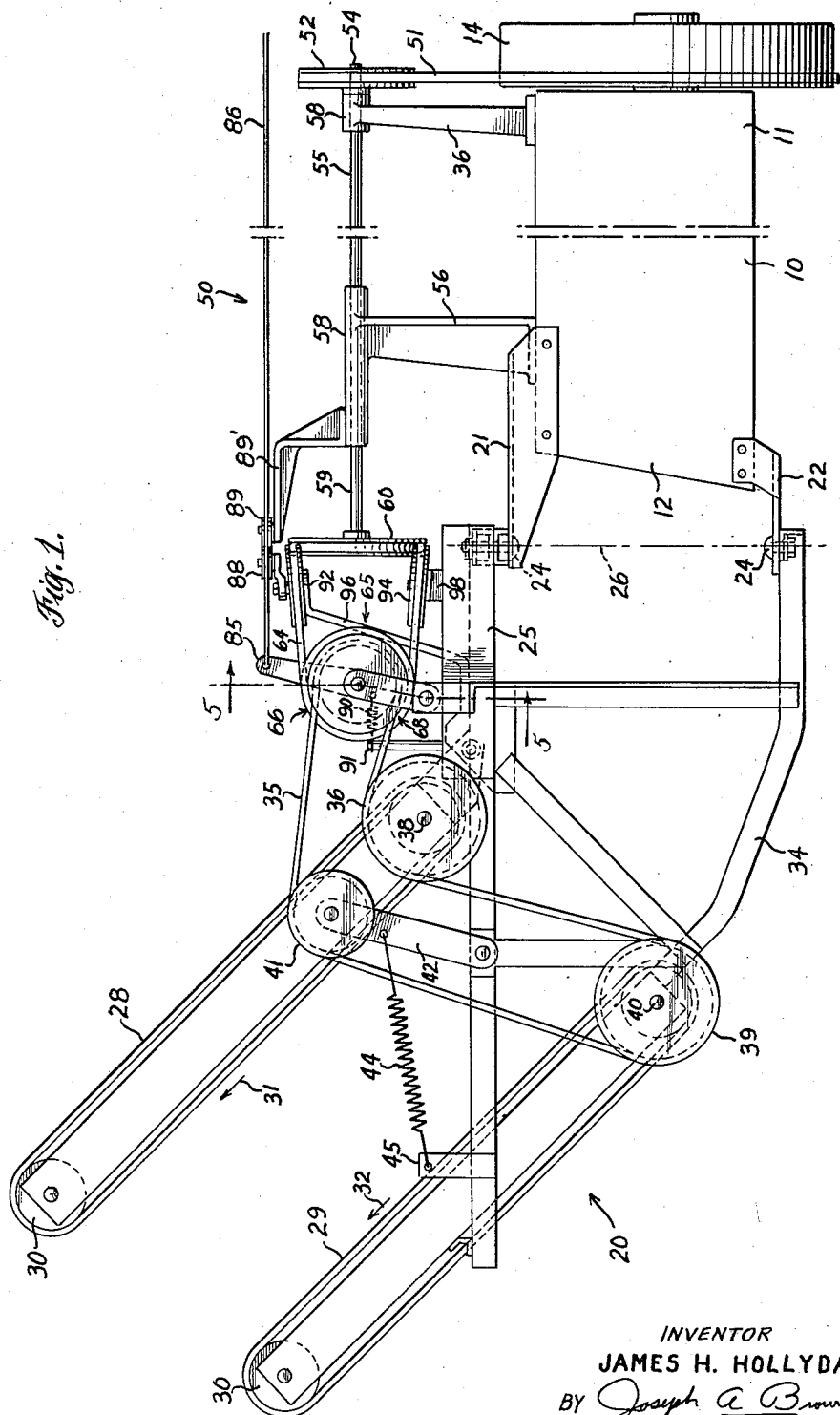
FIG. 1 is a side elevation of the bale case portion of a hay baler having mounted thereon a bale thrower, said thrower being driven by drive means constructed according to this invention.

Referring now to the drawings by numerals of reference, 10 denotes a baler bale case having a forward end 11 and a rear end 12. Bale case 10 extends in a fore-and-aft direction relative to the travel of the baler indicated by the arrow 13 in FIG. 2. Drive means 14 including a flywheel is provided for operating the baler. The flywheel is mounted on the forward end 11 of the bale case and is driven by a power-take-off connection, not shown, with the tractor which tows the baler or from some other source. A gear box 15 (FIG. 2) receives power from drive means 14 and distributes such power through the various operative components of the baler, not shown.

Mounted on the rear end 12 of the bale case 10 is a bale thrower 20 which is laterally swingable relative to the bale case. The bale thrower is connected by brackets 21 and 22 to the top and bottom respectively of the bale case 10. Vertically aligned pivot pins 24 are interconnected between brackets 21 and 22 and framework 25 of the thrower whereby the thrower is laterally swingable about a vertical axis indicated by the dot-dash line 26, FIG. 1. Axis 26 is located between the side walls of the bale case and on the longitudinal axis of bale case 10 indicated by dot-dash line 27, FIG. 2.

Bale thrower 20 comprises an upper endless conveyor 28 and a lower endless conveyor 29. These conveyors comprise relatively wide endless belts driven continuously over rollers 30 rotatable about horizontal axes. When viewed as shown in FIG. 1, the reaches of the upper endless conveyor 28 move in a clockwise direction indicated by arrow 31, while the reaches of the lower endless conveyor 21 move in a counterclockwise direction indicated by arrow 32. The endless conveyors 28 and 29 are made of rubber belting or the like and have a friction surface engageable with bales discharged from the bale case 10. The conveyors are spaced apart a distance substantially equal to the thickness of the bales discharged from the baler. The endless conveyors firmly engage the top and bottom of each discharged bale to impart a throwing action thereto.

Figure 3:
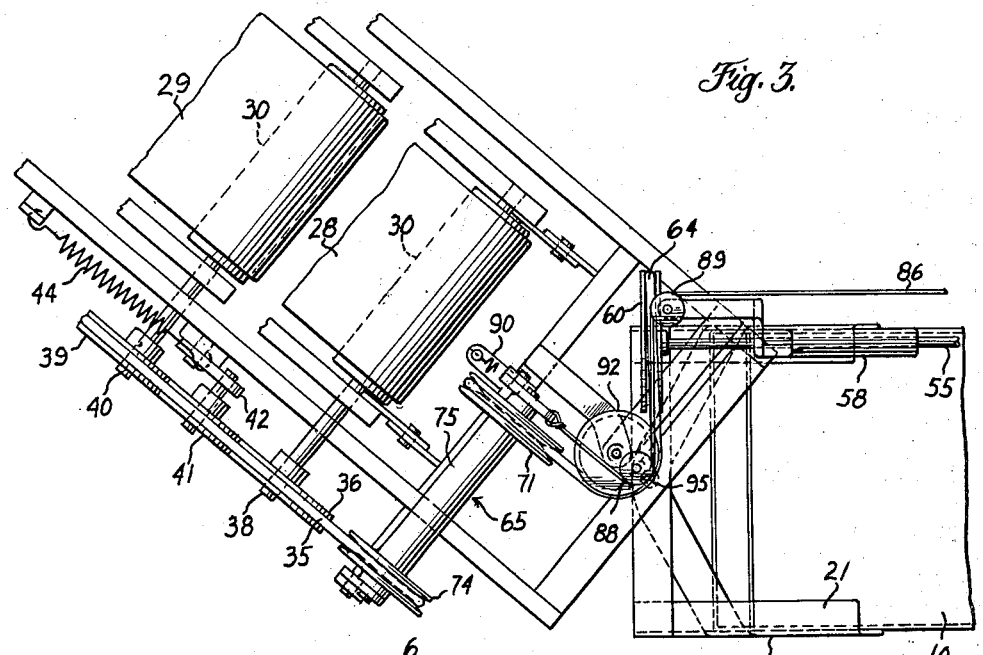
FIGS. 3 and 4 are fragmentary plan views showing the bale thrower in two different lateral positions relative to the bale case of the baler.
Figure 4:
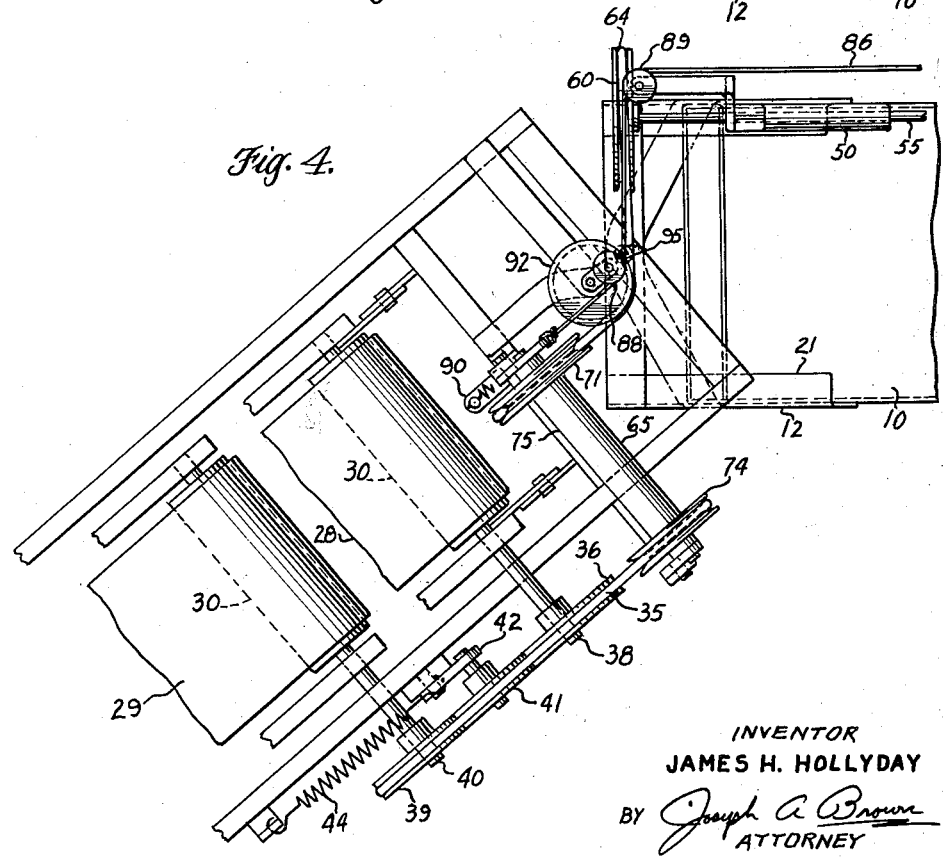

When a given bale emerges rearwardly from the bale case 10, it slides over the arcuate base 34 of frame 25 and is directed toward the continuously moving endless conveyors 28 and 29. When the bale is first engaged by the endless conveyors, there is some relative movement between the conveyors and the bale. However, the further the bale emerges the greater the grip the endless conveyors achieve on the bale and the bale is progressively increased in velocity and trajected upwardly and rearwardly to a wagon, not shown, trailing behind the baler. The thrower is laterally swingable about the vertical axis 26 so that the discharged bales will land in the wagon regardless of the position of the baler relative to the wagon. A suitable connection, not shown, is provided between the thrower and the wagon tongue so that the thrower will be swung laterally responsive to direction changes. In FIG. 3, the thrower is shown swung toward the left of bale case 10 while in FIG. 4 the thrower is shown swung laterally to the right. Suitable side guides, not shown, may be provided to direct each bale as it emerges from the bale case toward the thrower.

Endless conveyors 28 and 29 are both driven by the same endless belt 35 which extends around a pulley 36 connected by shaft 38 to the upper conveyor 28 and by a pulley 39 connected by a shaft 40 to the lower conveyor 29. Belt 35 is kept tight by an idler wheel 41 mounted on a lever 42 pivotally mounted on frame 25 and biased toward a tightening position by a spring 44 interconnected between the lever and a bracket 45 on the thrower frame.

Power is supplied to the endless belt 35 for operating bale thrower 20 by connecting means 50 constructed according to this invention. The power for operating the bale thrower is derived from the drive means 14 for the baler. An endless belt 51 driven from the drive means 14 and drives a sheave 52. Sheave 52 is connected to the forward end 54 of a fore-and-aft extending shaft 55 supported on brackets 56 mounted on top of and extending upwardly from bale case 10. The brackets 56 have co-axial sleeves 58 through which shaft 55 extends and in which the shaft is rotatable. The rear end 59 of shaft 55 carries a sheave 60. It will be noted from FIG. 2 that shaft 55 extends along the bale case 10 adjacent the left hand side thereof. The shaft is offset a substantial distance from the longitudinal axis 27 of the bale case.

Trained around sheave 60 is an endless belt 64 which is circular in cross-section. Belt 64 transmits power to a variable speed device 65 mounted on bale thrower frame 25. Device 65 is constructed as shown best in FIGS. 5–6 and comprises a pair of co-axial split sheaves, namely, inner split sheave 66 and outer split sheave 68. Sheaves 66 and 68 are axially spaced and mounted on a common cross-shaft 69. Sheave 66 has a fixed half 70 pinned to shaft 69 and a half 71 movable axially toward and away from the fixed half. Sheave 68 has a fixed half 72 pinned to shaft 69 and a half 74 movable axially toward and away from the fixed half. The movable sheave halves 71 and 74 are interconnected by a tube 75 surrounding shaft 69 and shiftable axially relative thereto on bushings 76.

Any axial movement of the half 71 of split sheave 66 is accompanied by a corresponding axial movement of the half 74 of split sheave 68. Belt 64 extends around sheave 66 and belt 35 around sheave 68. When tube 75 is shifted axially to the right from the position shown in FIG. 5 to the position shown in FIG. 6 the effective diameter of sheave 66 decreases while the effective diameter of sheave 68 increases. Conversely if tube 75 is shifted axially to the left from the position shown in FIG. 6 to the position shown in FIG. 5, the effective diameter of sheave 68 decreases and the effective diameter of sheave 66 increases. In this way, the transmission of power from belt 64 to belt 35 is variable and thus the speed of operation of the conveyors 28 and 29 of thrower 20.

Control of device 65 is achieved by mounting the cross-shaft 69 for shiftable movement in a fore-and-aft direction relative to bale thrower frame 25. Projecting upwardly from frame 25 are fixed brackets 80 having a pivot shaft 81 for upstanding support arms 82 and 84. The end of shaft 69 adjacent sheave 68 is journalled in arm 82 and the end of the shaft adjacent sheave 66 is journalled in arm 84. Arm 84 has an upwardly extending end 85 to which a control cable 86 is connected. Cable 86 extends forwardly from arm 84 (FIG. 2), around an idler pulley 88 mounted on bracket 88', then laterally to an idler pulley 89 mounted on extension 89' of rear sleeve 58 of support 56 and then forwardly to the baler operator. Arm 84 is biased to pivot rearwardly by a spring 90 connected between the arm and a fixed pin 91 (FIG. 1) on frame 25. Spring 90 is heavy enough that it will not be overcome by spring 44. The baler operator attaches the forward end of cable 86 to some fixed member to thereby hold arm 84 in a set position and thus establish the operative position of variable speed device 65.

When shaft 69 is shifted forwardly by pulling cable 86, for example from the position shown in FIG. 5 to the position shown in FIG. 6, the speed of thrower 20 is decreased. When shaft 69 is shifted rearwardly, under the pull of spring 90 by releasing or letting out cable 86, then the speed of thrower 20 is increased.

Figure 2:
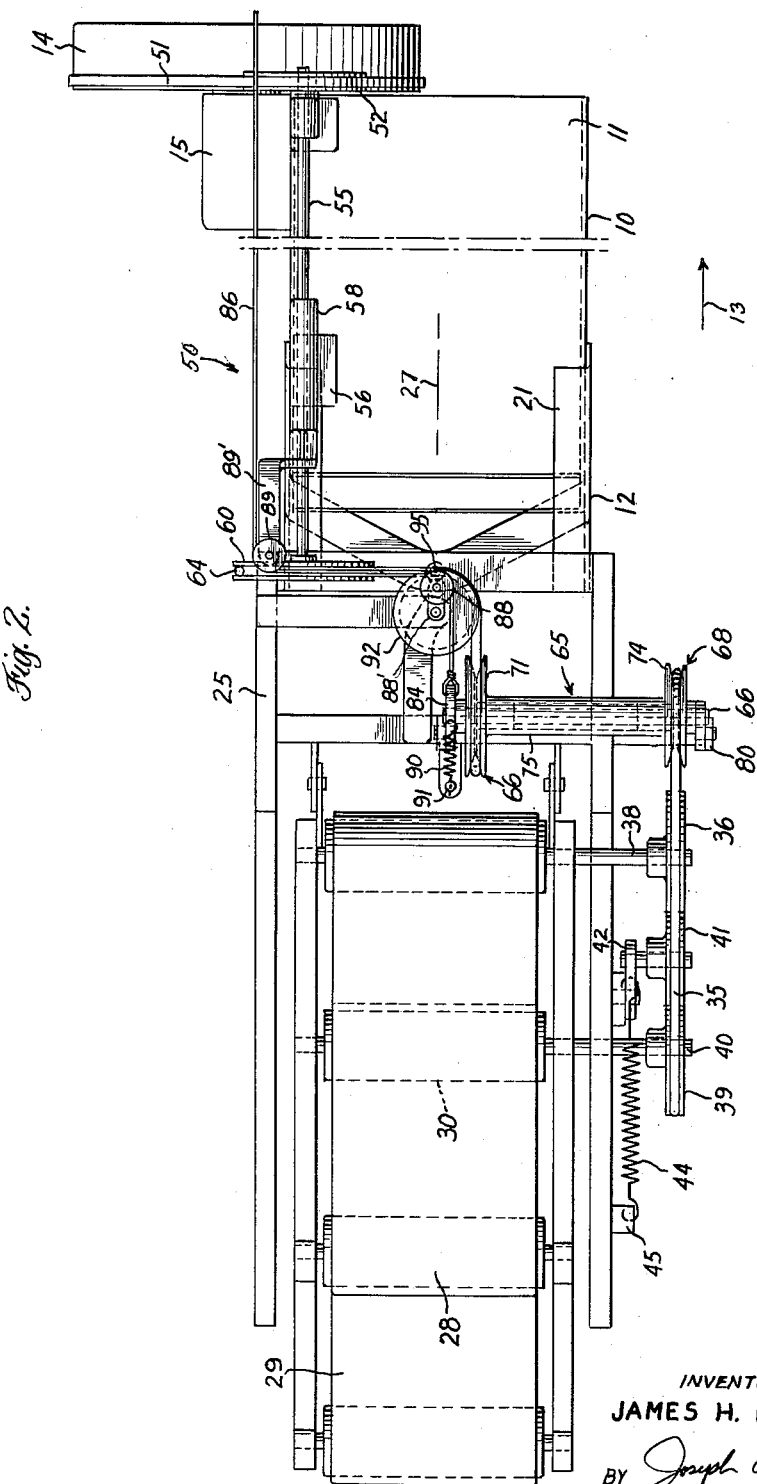
FIG. 2 is a plan view of FIG. 1.

To keep the speed of thrower 20 substantially contant regardless of the lateral position of the thrower relative to bale case 10, guide elements 92 and 94 (FIGS. 1 and 2) are provided for endless belt 64. These guide elements comprise idler wheels rotatable about a common vertical axis located in a plane along the longitudinal axis 27 when the thrower is in a neutral position (FIG. 2). Each wheel has a peripheral point 95 (FIGS. 1–4) located generally on the longitudinal axis 27 of the baler and in general alignment with the vertical pivot axis 26 of the thrower. Point 95 is so located that the transmission of power from sheave 60 to split sheave 66 remains substantially constant even though thrower 20 is swung left (FIG. 3) or right (FIG. 4) from the neutral position shown in FIG. 2, such speed being variable of course by shifting the position of shaft 69. Guide element 92 is mounted on a bracket 96 and element 94 is mounted on bracket 98.

The idler pulley 88 is also generally aligned with vertical pivot axis 26 so that cable 86 is not slackened or pulled when thrower 20 swings laterally.

The relative sizes of the sheaves used in power connection means 50 can be established as desired to provide a given speed of operation of thrower 20 and a certain variable speed range. One suitable arrangement is to provide a sheave 52 with a 7.65 inch P.D. (pitch diameter). If the flywheel of drive means 14 is driven by a power-take-off shaft of a tractor having a standard r.p.m. shaft 55 will be rotated at 1590 r.p.m. A sheave 60 is provided having a 8.65 P.D. Split sheave 66 has a P.D. variable from 7.00 to 5.62, while split sheave 68 has a pitch diameter variable from 4.00 to 5.38. A shifting of shaft 69 in the range of 2½ inches is required and the output of the variable speed device can be set anywhere from 1030 r.p.m. to 1720 r.p.m., as desired. The higher the speed of conveyors 28 and 29, the greater the distance each bale will be thrown.

With the drive arrangement described, the speed of operation of thrower 20 can be established as desired and such speed is not changed when the thrower swings laterally. The drive connection between the drive means 14 of the baler and the bale thrower 20 is relatively inexpensive, comprising simple, readily available endless belts and sheaves. Since no gasoline engine is used, the operator does not have to fill the gas tank for the engine before a baling operation. Likewise, he is not required to regularly clean the air cleaner of the engine and otherwise service it. All that is required to service drive connection 50 is an occasional lubrication of the moving parts which can be conducted at the same time that other components of the baler are lubricated. Since the components are simple and rugged, they are not adversely effected by dust, dirt and small particles of crop material which result incident to the baling operation.

The structure of connecting means 50 is relatively simple and inexpensive and can be provided without exceeding the cost of the gasoline engine which it replaces. Nevertheless, it can achieve all of the operative factors possessed by the gasoline engine and involves none of its liabilities incident to engine operation.

While this invention has been described in connection with a particular embodiment thereof, it will be understood that it is capable of further modification and this application is intended to cover any variations, uses, or adaptions of the invention following, in general, the principles of the invention and including such departures from the present disclosure as come within known or customary practice in the art to which the invention pertains, and as fall within the scope of the invention or the limits of the appended claims.

Having thus described my invention, what I claim is:

1. In combination, a baler having a bale case, a bale thrower at a rearward end of said bale case to receive bales therefrom and throw them away from the baler, means mounting said thrower on said bale case for lateral swinging movement about a vertical pivot axis and to each side of a neutral position whereby the direction of throw is variable, said pivot axis being located along a plane generally through the longitudinal center of said bale case, drive means on said baler, a drive sheave rotatably mounted on said bale case and connected to said drive means, a driven sheave rotatably mounted on said thrower, the location of said driven sheave relative to said drive sheave changing responsive to lateral swinging movement of said thrower, an endless belt connecting said drive and driven sheaves and having a pair of spaced reaches, a pair of idlers on said thrower and rotatable about axes in said plane when the thrower is in said neutral position, said axes being spaced from said pivot axis, one reach of said endless belt extending around one of said idlers and the other reach around the other idler, each idler having a particular portion adjacent the periphery thereof around which said belt travels located generally in vertical register with said thrower pivot axis and the length of belt travel from said drive sheave to said driven sheave and around said idlers remaining substantially constant when the thrower swings laterally whereby the drive to the thrower is unimpaired by such swinging.

2. In combination, a baler having a bale case, a bale thrower at a rearward end of said bale case to receive bales therefrom and throw them away from the baler, means mounting said thrower on said bale case for lateral swinging movement about a vertical pivot axis and to each side of a neutral position whereby the direction of throw is variable, said pivot axis being located along a plane generally through the longitudinal center of said bale case, drive means on said baler, a drive sheave rotatably mounted on said bale case and connected to said drive means, a driven sheave rotatably mounted on said thrower, the location of said driven sheave relative to said drive sheave changing responsive to lateral swinging movement of said thrower, an endless belt connecting said drive and driven sheaves and having a pair of spaced reaches, a pair of idlers on said thrower and rotatable about axes in said plane when the thrower is in said neutral position, said axes being spaced from said pivot axis on the side thereof toward the thrower, one reach of said endless belt extending around one of said idlers and the other reach around the other idler, each idler having a particular portion adjacent the periphery thereof around which said belt travels and located generally in vertical register with said thrower pivot axis and the length of belt travel from said drive sheave to said driven sheave and around said idlers remaining substantially constant when the thrower swings laterally whereby the drive to the thrower is unimpaired by such swinging, means operatively associated with the drive from said baler drive means to said driven sheave for varying the speed at which said driven sheave is rotated and thus the speed of operation of the thrower, and control means for operating said speed varying means.

3. In combination, a hay baler having an elongated bale case the longitudinal axis of which extends fore-and-aft relative to the direction of travel of the baler, a bale thrower at the rear end of said bale case to receive bales therefrom and throw them rearwardly, means mounting said thrower on said bale case for lateral swinging movement about a vertical pivot axis and to each side of a neutral position whereby the direction of throw is variable, said pivot axis being located along a plane generally through the longitudinal center of said bale case, said bale thrower having throwing means comprising a lower and an upper conveyor engageable with the bottom and top, respectively, of each bale discharged from said bale case, drive means on said baler, and means connecting said drive means to said throwing means to operate said lower and upper conveyors, said connecting means comprising a fore-and-aft extending shaft mounted on said bale case and rotatable relative thereto, means connecting said shaft to said drive means, a drive sheave connected to a rear end of said shaft and rotatable about a fore-and-aft axis, a driven sheave spaced from said drive sheave and mounted on said thrower for rotation about a horizontal axis transverse to said fore-and-aft axis, an endless belt connecting said drive and driven sheaves and having a pair of spaced reaches, a pair of idlers on said thrower and rotatable about a vertical axis in said plane when the thrower is in said neutral position and spaced from said pivot axis on the side thereof toward said thrower, one reach of said endless belt extending around one of said idlers and the other reach around the other idler, each idler having a particular portion adjacent the periphery thereof around which said endless belt travels and located generally in register with said thrower pivot axis and the belt length from the drive to the driven sheave remaining substantially constant regardless of lateral swinging of the thrower whereby the drive to the thrower is unimpaired by such swinging, a third sheave coaxial with said driven sheave, means drivingly connecting said driven sheave to said third sheave, and means including a second endless belt connecting said third sheave to said lower and upper conveyors of said throwing means.

4. The combination recited in claim 3 wherein said driven sheave and said third sheave comprise split sheaves mounted for rotation about a common transverse shaft shiftable relative to said thrower, said split sheaves being operative to vary the speed of the thrower.

5. The combination recited in claim 4 wherein each split sheave has an axially fixed half and a half movable on said shaft toward and away from its fixed half, and means connecting the movable half of said driven sheave to the movable half of said third sheave whereby when such movable half of said driven sheave moves axially away from its fixed half, the movable half of said third sheave correspondingly moves toward its fixed half.

6. The combination recited in claim 5 wherein a spring biased tightener pulley is provided for said second endless belt and interconnected between the thrower and the second belt.

7. The combination recited in claim 4 wherein said transverse shaft for said sheaves is movable in a direction toward and away from said bale case, spring means connecting said shaft to the thrower and yieldably holding the shaft in a given position.

8. The combination recited in claim 7 wherein control means is provided for moving said transverse shaft from said given position.

9. The combination recited in claim 8 wherein said transverse shaft moving means comprises a cable connected to said driven sheave for moving the transverse shaft from said given position and against the resistance of said spring means, said cable extending around a pulley supported in generally vertical alignment with said pivot axis whereby the extension of the cable from the pulley to the driven sheave remains relatively constant regardless of the lateral swinging of said thrower.

10. In combination, a hay baler having an elongated bale case the longitudinal axis of which extends fore-and-aft relative to the direction of travel of the baler, a bale thrower at the rear end of said bale case to receive bales therefrom and throw them rearwardly, means mounting said thrower on said bale case for lateral swinging movement about a vertical pivot axis and to each side of a neutral position whereby the direction of throw is variable, said pivot axis being located along a plane generally through the longitudinal center of said bale case, said bale thrower having throwing means comprising a lower and an upper conveyor engageable with the bottom and top, respectively, of each bale discharged from said bale case, a fore-and-aft extending shaft mounted on said bale case along one side thereof and rotatable relative thereto, drive means on said baler, means connecting said drive means to said shaft, a drive sheave connected to a rear end of said shaft and rotatable about a fore-and-aft axis, a driven sheave spaced from said drive sheave and mounted on said thrower for rotation about a horizontal axis transverse to said fore-and-aft axis, an endless belt connecting said drive and driven sheaves and having a pair of spaced reaches, a pair of idlers mounted on said thrower for rotation about a vertical axis in said plane when the thrower is in said neutral position and spaced from said pivot axis on the side thereof toward said thrower, one reach of said endless belt extending around one of said idlers and the other reach around the other idler, each idler having a particular portion adjacent the periphery thereof around which said endless belt travels and located generally in register with said thrower pivot axis and the belt length from the drive to the driven sheave remaining substantially constant regardless of the lateral swinging of the thrower whereby the drive to the thrower is unimpaired by such swinging, a transverse shaft rotatably supported on said thrower, said driven sheave being rotatably mounted on said transverse shaft, a third sheave axially spaced from said driven sheave and also mounted on said transverse shaft, said driven sheave and said third sheave being split sheaves each having a half fixed relative to said transverse shaft and a half axially slidable relative thereto, means connecting the movable half of said driven sheave to the movable half of said third sheave whereby when such movable half of said driven sheave moves axially away from its fixed half, the movable half of said third sheave correspondingly moves towards its fixed half, a second endless belt connecting said third sheave to said lower and upper conveyors of said throwing means, a spring biased tightener pulley engaging said second endless belt and interconnected between the thrower and the second belt, said transverse shaft being supported on said thrower for shiftable movement in a fore-and-aft direction relative thereto, spring means yieldably holding said transverse shaft in a given normal position, and control means for shifting the shaft from said given position.

References Cited in the file of this patent

UNITED STATES PATENTS

| | | |
|---|---|---|
| 321,067 | Watkins | June 30, 1885 |
| 1,759,085 | Bebinger | May 20, 1930 |
| 2,314,259 | Welty | Mar. 16, 1943 |
| 2,539,689 | Bobrowski | Jan. 30, 1951 |